US009575753B2

(12) United States Patent
Eichenberger et al.

(10) Patent No.: US 9,575,753 B2
(45) Date of Patent: Feb. 21, 2017

(54) SIMD COMPARE INSTRUCTION USING PERMUTE LOGIC FOR DISTRIBUTED REGISTER FILES

(75) Inventors: Alexandre E. Eichenberger, Chappaqua, NY (US); Bruce M. Fleischer, Bedford Hills, NY (US)

(73) Assignee: International Business Machines Corporation, Armonk, NY (US)

( * ) Notice: Subject to any disclaimer, the term of this patent is extended or adjusted under 35 U.S.C. 154(b) by 1379 days.

(21) Appl. No.: 13/420,699

(22) Filed: Mar. 15, 2012

(65) Prior Publication Data

US 2013/0246737 A1   Sep. 19, 2013

(51) Int. Cl.
*G06F 9/30* (2006.01)
*G06F 9/38* (2006.01)

(52) U.S. Cl.
CPC ....... *G06F 9/30032* (2013.01); *G06F 9/30021* (2013.01); *G06F 9/30036* (2013.01); *G06F 9/3838* (2013.01)

(58) Field of Classification Search
CPC .................................................. G06F 9/30021
See application file for complete search history.

(56) References Cited

U.S. PATENT DOCUMENTS

| 4,224,664 | A | 9/1980 | Trinchieri |
| 5,983,335 | A | 11/1999 | Dwyer, III |
| 8,131,979 | B2 | 3/2012 | Gonion et al. |
| 2002/0007449 | A1 | 1/2002 | Koyanagi |
| 2004/0015677 | A1* | 1/2004 | Moreno et al. ................. 712/22 |
| 2009/0249026 | A1 | 10/2009 | Smelyanskiy et al. |
| 2010/0042779 | A1 | 2/2010 | Espasa et al. |
| 2013/0166516 | A1* | 6/2013 | Reid ............................. 707/690 |

FOREIGN PATENT DOCUMENTS

| CN | 1497435 A | 5/2004 |
| CN | 102073478 A | 5/2011 |
| CN | 102103570 A | 6/2011 |

OTHER PUBLICATIONS

Eichenberger, Alexandre E. et al., "Matrix Multiplication Operations Using Pair-Wise Load and Splat Operations", U.S. Appl. No. 12/834,464, filed Jul. 12, 2010.

(Continued)

*Primary Examiner* — John Lindlof
(74) *Attorney, Agent, or Firm* — Francis Lammes; Stephen J. Walder, Jr.; Jennifer R. Davis

(57) ABSTRACT

Mechanisms, in a data processing system comprising a single instruction multiple data (SIMD) processor, for performing a data dependency check operation on vector element values of at least two input vector registers are provided. Two calls to a simd-check instruction are performed, one with input vector registers having a first order and one with the input vector registers having a different order. The simd-check instruction performs comparisons to determine if any data dependencies are present. Results of the two calls to the simd-check instruction are obtained and used to determine if any data dependencies are present in the at least two input vector registers. Based on the results, the SIMD processor may perform various operations.

25 Claims, 10 Drawing Sheets

(56) References Cited

OTHER PUBLICATIONS

Franchetti, Franz et al., "Generating SIMD Vectorized Permutations", Lecture Notes in Computer Science, vol. 4959, 2008, pp. 116-131.
Kumar, Sanjeev et al., "Atomic Vector Operations on Chip Multiprocessors", International Symposium on Computer Architecture, Jun. 21-25, 2008, pp. 441-452.
Nuzman, Dorit et al., "Auto-Vectorization of Interleaved Data for SIMD", IBM Research Report H-0235 (H0512-001), Nov. 30, 2005, pp. 1-10.
Thakkar, Shreekant (Ticky) et al., "Internet Streaming SIMD Extensions", IEEE Computer, vol. 32, #12, 1999, pp. 26-34.
Thakkar, Shreekant (Ticky), "The Internet Streaming SIMD Extensions", Intel Corporation, Foil presentation, Jul. 12, 1999, 41 pages.

\* cited by examiner

SIMD COMPARE INSTRUCTION USING PERMUTE LOGIC FOR DISTRIBUTED REGISTER FILES

BACKGROUND

The present application relates generally to an improved data processing apparatus and method and more specifically to mechanisms for performing a Single Instruction Multiple Data (SIMD) address compare operation that utilizes permute logic for distributed register files.

When performing various operations within a processor, such as gather/scatter operations, it is important to verify that memory locations upon which such operations are performed are distinct, i.e. there are no data dependencies on these memory locations. If the memory locations are not distinct, then the performance of the gather/scatter operation may cause a violation of the data dependencies resulting in data corruption and errors in the execution of computer code. Currently, performing comparison operations on the memory locations to determine if there are any data dependencies that may be violated is an expensive process in terms of numbers of instructions, processor cycles, power consumption, and the like.

SUMMARY

In one illustrative embodiment, a method, in a data processing system comprising a single instruction multiple data (SIMD) processor, for performing a data dependency check operation on vector element values of at least two input vector registers is provided. The method comprises executing, by the SIMD processor, a first call of a simd-check instruction using the at least two vector registers as input vector registers of the simd-check instruction. The at least two vector registers have a first order of input to the simd-check instruction. The method further comprises obtaining, by the SIMD processor, a first result of the execution of the first call of the simd-check instruction. The first result indicates if any comparison operations of the first call of the simd-check instruction resulting in a data dependency being detected.

The method also comprises executing, by the SIMD processor, a second call of a simd-check instruction using the at least two vector registers as input vector registers of the simd-check instruction. The at least two vector registers have a second order of input to the simd-check instruction that is different from the first order of input to the simd-check instruction. In addition, the method comprises obtaining, by the SIMD processor, a second result of the execution of the second call of the simd-check instruction. The second result indicates if any comparison operations of the second call of the simd-check instruction resulting in a data dependency being detected. Moreover, the method comprises executing an operation in the SIMD processor based on the first result and the second result.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the exemplary embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
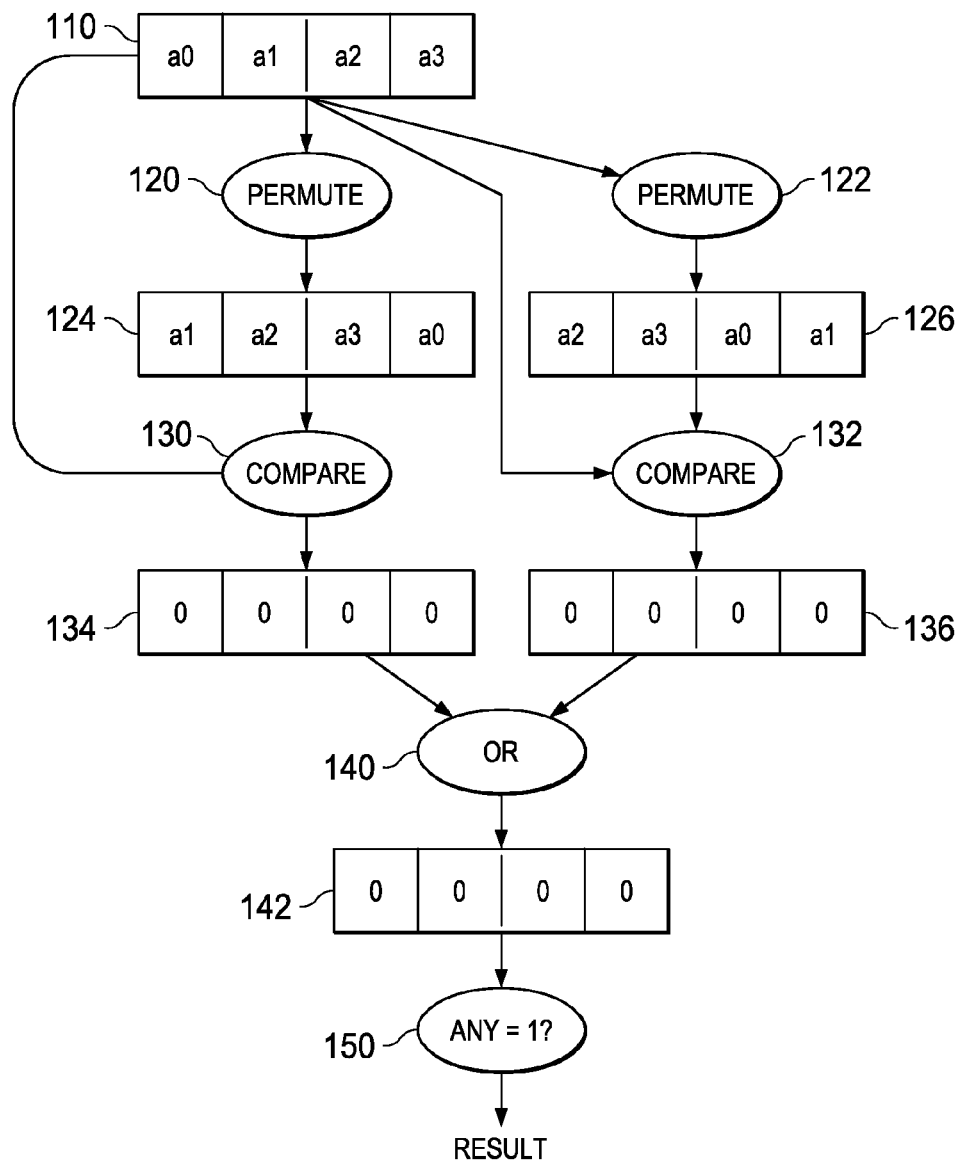
FIG. 1 is an example diagram illustrating a check of addresses in a single input vector register for distinctiveness.

The illustrative embodiments provide mechanisms for performing a Single Instruction Multiple Data (SIMD) address compare operation that utilizes permute logic for distributed register files. With the mechanisms of the illustrative embodiments, a new type of instruction, referred to herein as a "simd-check" instruction is provided for execution within hardware of a SIMD enabled processor that facilitates comparisons of vectors of addresses to determine if any data dependencies may be violated when performing an memory addressing operation, such as a gather or scatter operation, for example. Note that while the present description will focus on the use of this new type of instruction to compare vectors of address values, this new type of instruction is not restricted to comparing address values and, in fact, can also be used to compare other types of values, such as integer or floating point values.

The new simd-check instruction utilizes a permute unit of the processor to permute the input vectors of the instruction so that the comparisons may be performed. The simd-check instruction is called twice with permuted vector register inputs. The simd-check instruction performs a comparison of the addresses contained in the permuted vector register inputs and outputs a vector result indicating if there are any matches or not. The simd-check instruction only utilizes four compare-all-bits-equal operations, and thus associated comparison sub-units, per vector element of the input vector registers.

For example, when performing a memory addressing operation, the SIMD unit(s) of the processor may call the simd-check instruction of the illustrative embodiments twice. In a first call of the simd-check instruction, the first and second vector registers to be checked for data dependencies are passed to the simd-check instruction as first and second operands to be checked. In the second call of the simd-check instruction, the first and second vector registers to be checked for data dependencies are passed as second and first operands, respectively (i.e. the operands are switched). The simd-check instruction is constructed so that all pairwise elements in the first and second vector register inputs to be checked are tested by the conjunction of the first and second call to the simd-check instruction.

The simd-check instruction of the illustrative embodiments is optimized to use minimum propagation of vector values that may be remote. That is, in one illustrative embodiment, the simd-check instruction is configured for SIMD units having a distributed register file such that only one remote value and one neighbor value need to be communicated per vector element of the input vectors, i.e. communicated between vector elements or from logic associated with one vector element to logic associated with another vector element.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RE), etc., or any suitable combination thereof.

Computer program code for carrying out operations for aspects of the present invention may be written in any combination of one or more programming languages, including an object oriented programming language such as Java™ Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1 is an example diagram illustrating a check of addresses in a single input vector register for distinctiveness. For purposes of this description, it is assume that each input vector register comprises four vector elements, or "slots", where each vector element may store a memory address referencing data or instructions to be used as part of an operation in a SIMD unit of a processor. It should be appreciated that while a four vector element vector register is shown in FIG. 1, the illustrative embodiments are not limited to such and vector registers having more vector elements than four may be used without departing from the spirit and scope of the illustrative embodiments.

As shown in FIG. 1, addresses a0, a1, a2, and a3 are stored in the four vector elements of the input vector register 110. In order to ensure that each of the addresses is distinct, i.e. one address in one of the vector elements is not the same as another address in another vector element, two permute operations 120-122, two compare operations 130-132, a logic operation 140, and one test operation 150 must be performed. That is, a first permute operation 120 is performed to shift the vector elements one position to the left and then a comparison 130 between the original vector register elements 110 and the shifted vector register elements 124 is performed so that comparisons of a0 to a1, a1 to a2, a2 to a3, and a3 to a0 are performed. The result of these comparisons of the compare operation 130 is either a logical 0 value indicating that the addressed do not match or a logical 1 indicating that the addresses match. In the depicted example, it is assumed that each address in each of the vector elements is distinct.

A second permute operation 122 is performed to shift the vector elements two positions to the left to thereby generate permuted vector register 126. Again a compare operation 132 is performed between the vector elements of the input vector register 110 and the shifted vector register 126 resulting in comparisons of a0 to a2, a1 to a3, a2 to a0, and a3 to a1. The results of the comparison 130 are stored in a results vector register 134 and the results of the comparison 132 are stored in a result vector register 136. A logical operation 140 is performed on these result vector registers 134 and 136 to determine if any of the comparisons resulted in a violation of data dependency, i.e. any of the addresses in the vector register 110 are not distinct. The result of this logical operation 140 is stored in result vector register 142. A test operation 150 is performed on the elements of the result vector register 142 to determine if there was any violation of data dependency. In this case, the test operation 150 is a test as to whether any of the vector elements of the result vector register 142 are non-zero. If so, then a data dependency violation has been detected. If not, then no data dependency violation is detected and the memory addressing operation may be performed without risk of corruption or error due to data dependency violations.

Thus, in this example, 2 permute operations, 2 compare operations, one logical operation, and one test operation, for a total of 6 operations are needed to perform the comparison of all four values of the vector register 110. In general, assuming that there are n values to be checked, in order to perform the comparisons to compare each value to each other value requires n−1 compares for the first value, n−2 compares for the second value, 1 compare for the second to last value, and 0 compares for the last value. This is essentially n(n−1)/2 individual compare operations or approximately n(n−1)/(2v) vector compare operations where v is a vector length. The number of permute operations is approximately n/2. The number of logical or test operations is one logical or test per compare operation. This gives a total number of operations of approximately n(n−1)/v+n/2, i.e. $O(n^2/v)$.

Thus, if one assumes a four vector element wide SIMD vector register architecture, in order to compare two SIMD vector registers' address values, i.e. four address values in each of the two SIMD vector registers, a total of 28 individual compare operations are necessary. Using the same approach as in FIG. 1 but extended to compare two vectors of addresses instead of one, it would take 4 vector permutes, 7 vector compares, 6 vector logical operations, and one vector test operation to detect a dependency between any two of the eight addresses. The illustrative embodiments are configured to perform a compare of 4 values per vector slot giving a total of 16 compare operations. The illustrative embodiments comprise compare logic that is configured such that the 16 compare operations generate all of the required unique 28 individual compares required to compare all 8 address values of the two vector registers.

With the illustrative embodiments, a simd-check instruction is called once with the input vector registers passed to the simd-check instruction, e.g., vector registers <a0, a1, a2, a3>, <b0, b1, b2, b3>. The simd-check instruction is called a second time with the input vector registers switched, e.g., <b0, b1, b2, b3>, <a0, a1, a2, a3>. Each of these two checks provide a portion of the 28 individual comparisons required to compare all of the comparison results for determining if there are any data dependencies or not between the vector elements of the two vector registers.

Figure 2:
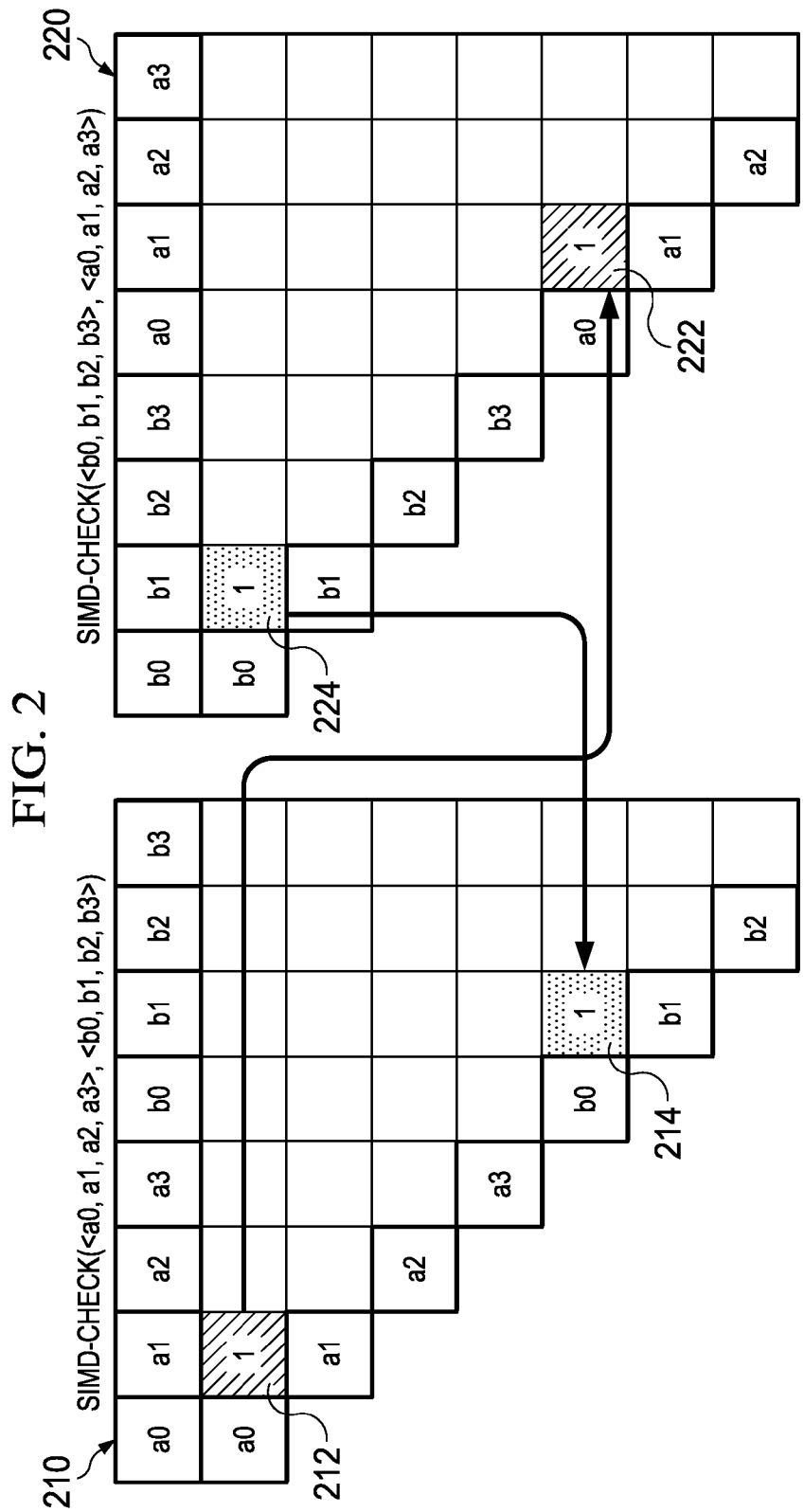
FIG. 2 is an example diagram illustrating comparison tables for the two calls of the simd-check instruction in accordance with one illustrative embodiment.

FIG. 2 is an example diagram illustrating comparison tables for the two calls of the simd-check instruction in accordance with one illustrative embodiment. Because the goal is to compare every one of the a0, a1, a2, a4, b0, b1, b2, and b3 values with each other, the sequence of the two calls to the instruction is designed to cover all of the 28 compares, illustrated by the boxes in FIG. 2. The first comparison table 210 illustrates the comparisons performed between address values of the vector elements of the two vector registers <a0, a1, a2, a3> and <b0, b1, b2, b3> during a first call of the simd-check instruction. The second comparison table 220 illustrates the comparisons performed between address values of vector elements of the two vector registers during a second call of the simd-check instruction where the input vector registers are switched, i.e. <b0, b1, b2, b3> and <a0, a1, a2, a3>.

Hardware comparison logic may be provided for comparing each of the vector elements with four other vector elements. For example, hardware comparison logic may be provided for performing a first comparison operation for comparing vector element a0 with vector element a1 (as illustrated by the cross-hatch shaded "1" box 212 in table 210). The result of this comparison may be used for the first compare performed during the first simd-check instruction call, but also provides the comparison of a1 to a0 in the second call of the simd-check instruction as shown by the cross-hatch shaded "1" box 222 in the second comparison table 220. The same is true of the comparisons performed by the second call of the simd-check instruction as depicted by the dot shaded "1" boxes 214 and 224 in comparison tables 210 and 220. It should be noted that full square tables 210 and 220 are not needed since the comparisons are commutative.

Figure 3:
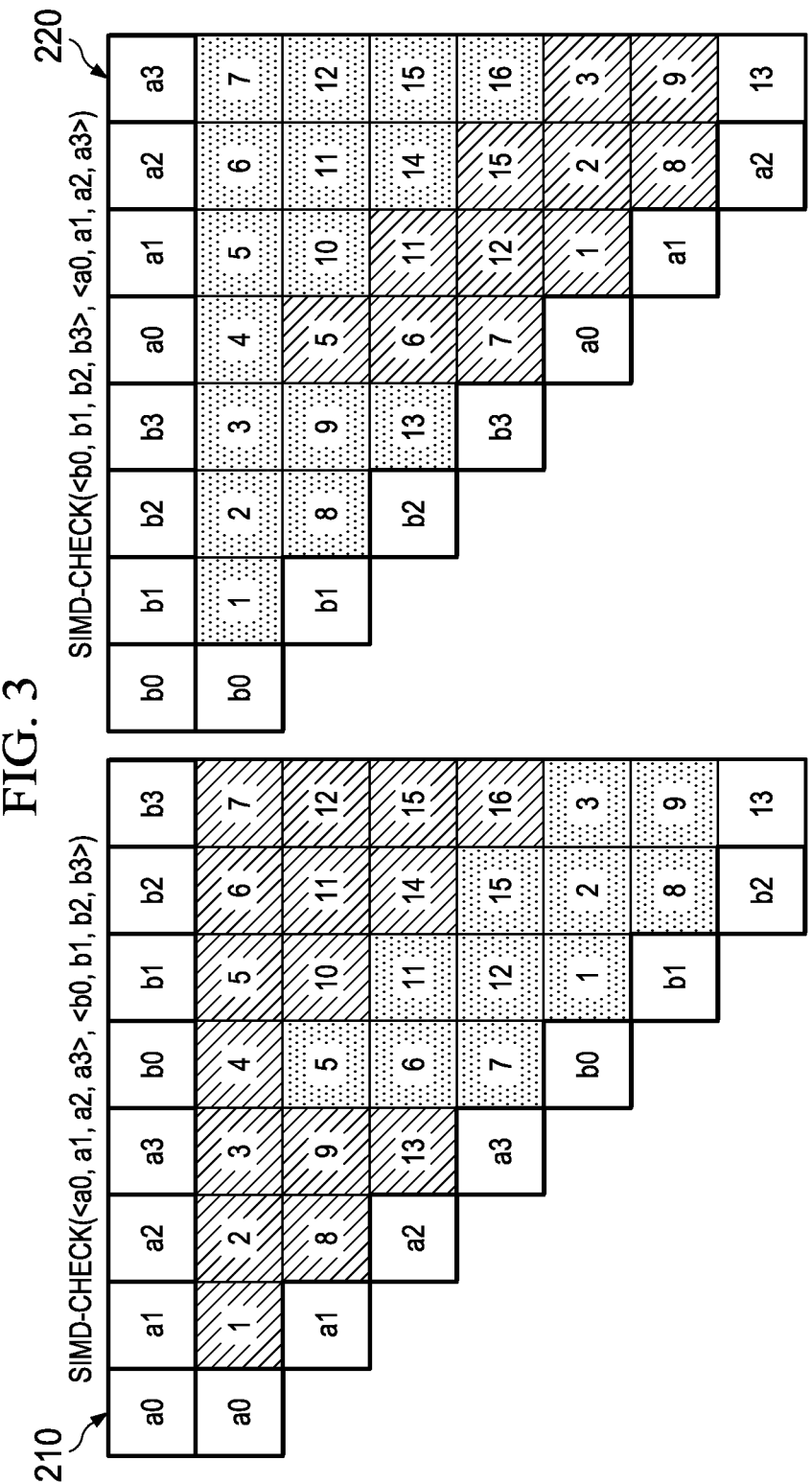
FIG. 3 is an example diagram illustrating completed comparison tables corresponding to the two simd-cheek instruction calls in FIG. 2 in accordance with one illustrative embodiment.

FIG. 3 is an example diagram illustrating completed comparison tables corresponding to the two simd-check instruction calls in FIG. 2 in accordance with one illustrative embodiment. As shown in FIG. 3, the completed first comparison table 310 comprises the results of the first call of the simd-check instruction corresponding to results in cross-hatch shaded boxes numbered 1-16. These boxes correspond to comparisons between a0 and a1, a0 and a2, a0 and a3, a0 and b0, a0 and b1, a0 and b2, a0 and b3, a1 and a2, a1 and a3, a1 and b1, a1 and b2, a1 and b3, a2 and a3, a2 and b2, a2 and b3, and a3 and b3. The completed first comparison table 310 further comprises the results of the second call of the simd-check instruction corresponding to the results in the dotted shaded boxes number 1-13. These boxes correspond to the comparisons of b0 and a1, b0 and a2, b0 and a3, b1 and a2, b1 and a3, b1 and b0, b2 and a3, b2 and b0, b2 and b1, b3 and b0, b3 and b1, and b3 and b2. A similar completed comparison table for the second simd-check instruction call is shown in comparison table 320 where the values in check-hash boxes are obtained from the first call of the simd-check instruction and values in the dotted shaded boxes are obtained from the second call of the simd-check instruction.

From these two comparison tables it can be seen that with the simd-check instruction of the illustrative embodiments, and performing two calls of the simd-check instruction with the input vector registers being switched, only 16 comparisons are needed to generate all 28 comparison results needed to determine whether there are any data dependencies, i.e. that the addresses in the various vector elements of the vector registers are distinct. With the illustrative embodiments, a compiler or other optimization mechanism may insert into executable code the two calls to the simd-check instruction as described above for memory addressing operations, such as scatter or gather operations for example, in source code. Hardware implemented comparison logic is provided in the processor hardware to implement four comparisons per vector element of input vector registers, resulting in a total of 16 comparison operations being performed for comparing two four vector element input vector registers, for example. These 16 comparison operations provide all of the necessary 28 comparisons to determine if there are any data dependencies.

As mentioned above, the illustrative embodiments utilize the new simd-check instruction which is called twice with the input vector registers switched. In addition, hardware logic is provided for implementing four comparisons per vector element. Thus, in an architecture where vector registers are comprised of four vector elements, then 16 comparisons are implemented by the hardware logic of the illustrative embodiments. This hardware logic may be provided, for example, in a permute unit of a processor, for example.

Figure 4:
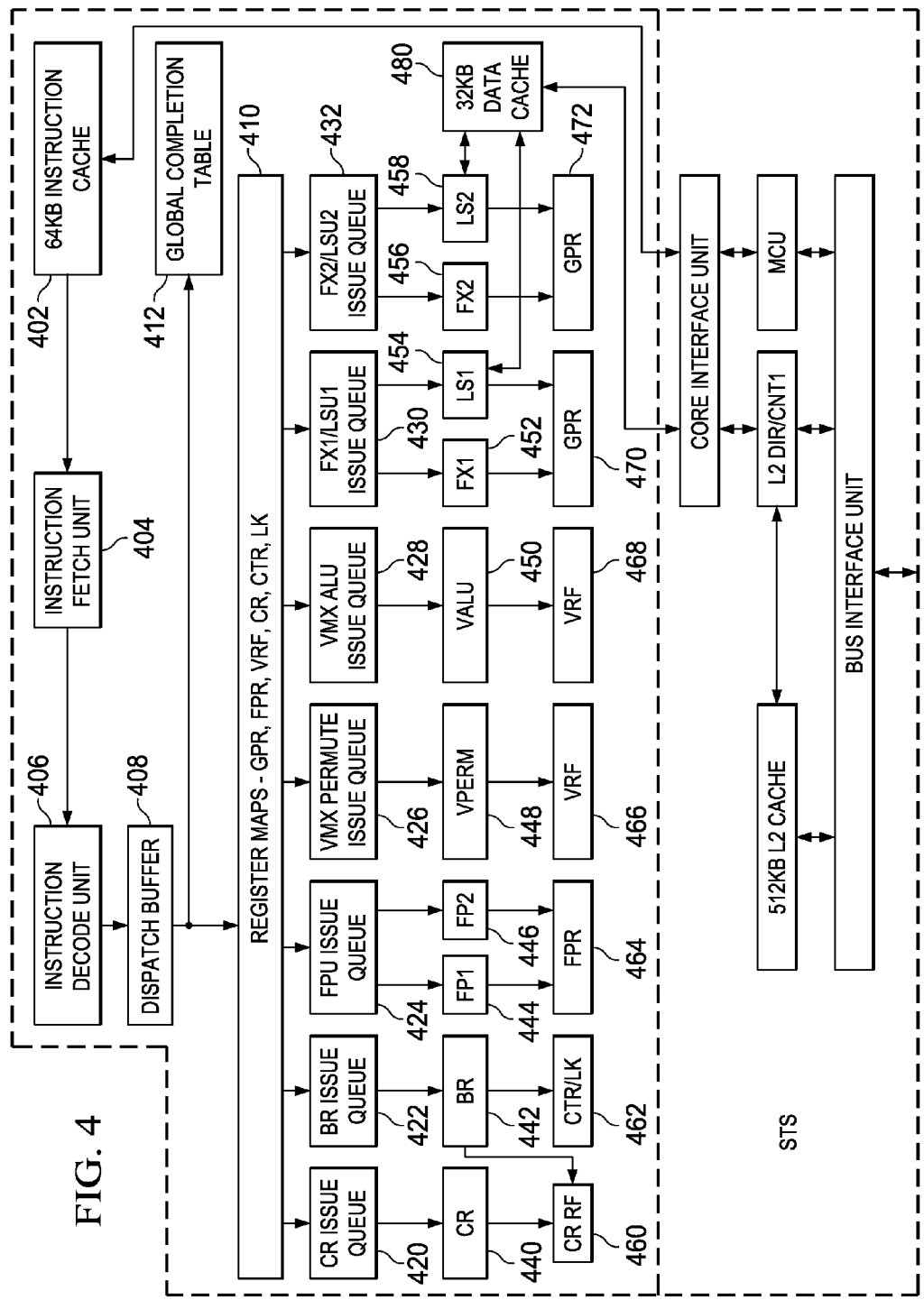
FIG. 4 is a block diagram of a processor architecture that implements a single instruction multiple data (SIMD) instruction set architecture (ISA) in which aspects of the illustrative embodiments may be implemented.

FIG. 4 is a block diagram of a processor architecture that implements a single instruction multiple data (SIMD) instruction set architecture (ISA) in which aspects of the illustrative embodiments may be implemented. It should be appreciated that the architecture shown in FIG. 3 is only exemplary and is not intended to state or imply any limitation with regard to the particular implementations of the present invention that may be made in view of the present description. To the contrary, the new simd-check instruction may be implemented in any architecture that comprises compare logic for performing the compare operations described herein, whether in a permute unit, separate hardware unit, or integrated in another hardware unit of a processor.

As shown in FIG. 4, the processor architecture includes an instruction cache 402, an instruction fetch unit 404, an instruction decode unit 406, and a dispatch buffer 408. Instructions are fetched by the instruction fetch unit 404 from the instruction cache 402 and provided to the instruction decode unit 406. The instruction decode unit 406 decodes the instruction and provides the decoded instruction to the dispatch buffer 408. The output of the decode unit 406 is provided to both the register maps 410 and the global completion table 412. The register maps 410 map to one or more of the general purpose registers (GPRs), floating point registers (FPRs), vector register files (VRF), and the like. The instructions are then provided to an appropriate one of the issues queues 420-432 depending upon the instruction type as determined through the decoding and mapping of the instruction decode unit 406 and register maps 410. The issue queues 420-432 provide inputs to various ones of execution units 440-458. The outputs of the execution units 440-458 go to various ones of the register files 460-472. Data for use with the instructions may be obtained via the data cache 480.

In the depicted architecture there are separate issue queues and execution units for floating point, vector, and fixed point, or integer, instructions in the processor. As shown, there is a single floating point unit (FPU) issue queue 424 that has two output ports to two floating point execution units 444-446 which in turn have output ports to a floating point register file 464. A single vector permute issue queue 426 has a single output port to a vector permute execution unit 448 which in turn has a port for accessing a vector register file (VRF) 466. The vector arithmetic logic unit (ALU) issue queue 428 has one issue port for issuing instructions to the vector ALU 350 which has a port for accessing the vector register file 468.

The vector permute execution unit 448 operates to provide a mechanism for rearranging the data elements in the slots of a vector register. That is, based on one or more input vectors, and a control input, the vector permute execution unit 448 can rearrange the data elements of the one or more vectors such that they are in different slots of a resulting vector register. The permute operation will be described in greater detail hereafter with regard to the permute functionality provided in an alternative embodiment illustrated in FIG. 5.

Figure 5:
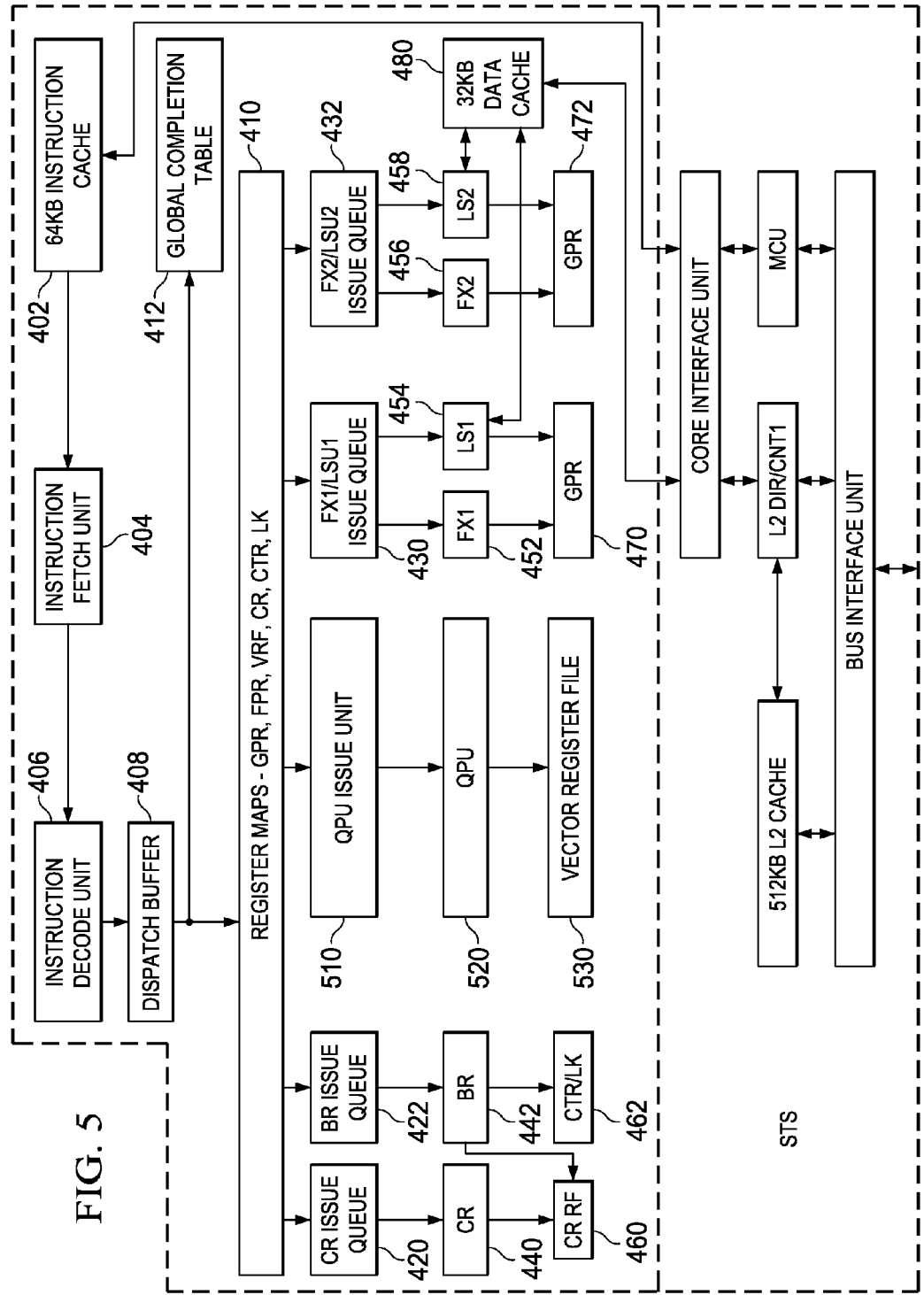
FIG. 5 is an alternative example processor architecture in which the illustrative embodiments of the present invention may be implemented.

FIG. 5 is an alternative example processor architecture in which the illustrative embodiments of the present invention may be implemented. The architecture shown in FIG. 5 is an example of a floating point (FP) only SIMD processor architecture in which the issue units 424-428, the execution units 444-450, and register files 464-468 in FIG. 4 are replaced with a single issue queue, execution unit, and register file. An example of the processor architecture in FIG. 5 and corresponding instruction set architecture (ISA) is described in commonly assigned and co-pending U.S. patent application Ser. No. 12/834,464, which is hereby incorporated by reference.

The processor architecture shown in FIG. 5 is of a modified form of the architecture shown in FIG. 4 and thus, similar elements to that of FIG. 4 are shown with similar reference numbers. It should be appreciated that the example modified architecture is only an example and similar modifications can be made to other processor architectures to reduce the number of issue units, execution units, and register files implemented in these other architectures. Thus, the mechanisms of the illustrative embodiments are not limited to implementation in a modified form of the processor architecture of FIG. 4. Moreover, other types of vector processor architectures may be used to implement the mechanisms of the illustrative embodiments as long as the architecture provides logic for implementing a permute functionality as described hereafter.

As shown in FIG. 5, the modified architecture shown in FIG. 5 replaces the issue units 424-428 with a single quad-processing execution unit (QPU) issue unit 510. Moreover, the execution units 444-450 are replaced with the single quad-processing execution unit (QPU) 520. Furthermore, the register files 464-468 are replaced with a single quad-vector register file (QRF) 530. Because the quad-processing unit (QPU) can execute up to 4 data elements concurrently with a single instruction, this modified architecture not only reduces the resource usage, area usage, and power usage, while simplifying the design of the processor, but the modified architecture also increases performance of the processor.

It should be noted that the modified processor architecture in FIG. 5 still has the fixed point units (FXUs) which process scalar integers. Such scalar integers are used primarily for control operations, such as loop iterations, and the like. All other instructions are of the floating-point or vector format. Specifically, unlike the mixed floating point and integer execution repertoire of the VMX instruction set, the QPX instructions generally operate, and in particular perform arithmetic operations, on floating point data only. The only storage of integer-typed data is associated with conversion of data to an integer format for the purpose of loading and storing such integers, or moving a control word to and from the floating point status and control register (FPSCR). Reducing operations to a floating point-only format greatly enhances efficiency of floating point processing, as an appropriate internal representation optimized for the representation and processing of floating numbers can be chosen without regard to the needs of integer arithmetic, logical operations, and other such operations.

In accordance with one illustrative embodiment, with the floating-point only SIMD ISA, there is no requirement to support integer encoding for the storage of comparison results, Boolean operations, selection operations, and data alignment as is required in prior known ISAs. The floating-point (FP) only SIMD ISA allows substantially all of the data to be stored as floating point data. Thus, there is only one type of data stored in the vector register file 530 in FIG. 5.

In accordance with an illustrative embodiment, the FP only SIMD ISA provides the capability to compare floating point vectors and store comparison results in a floating point vector register of the vector register file 530. Such comparisons are utilized when performing dependency checks using the new simd-check instruction of the illustrative embodiments and may be implemented in hardware logic built into one or more of the units of the processor architecture. In particular, in one illustrative embodiment, the vector permute execution unit 448 may be modified to incorporate additional logic for implementing the comparisons of the simd-check instruction of the illustrative embodiments.

Figure 6:
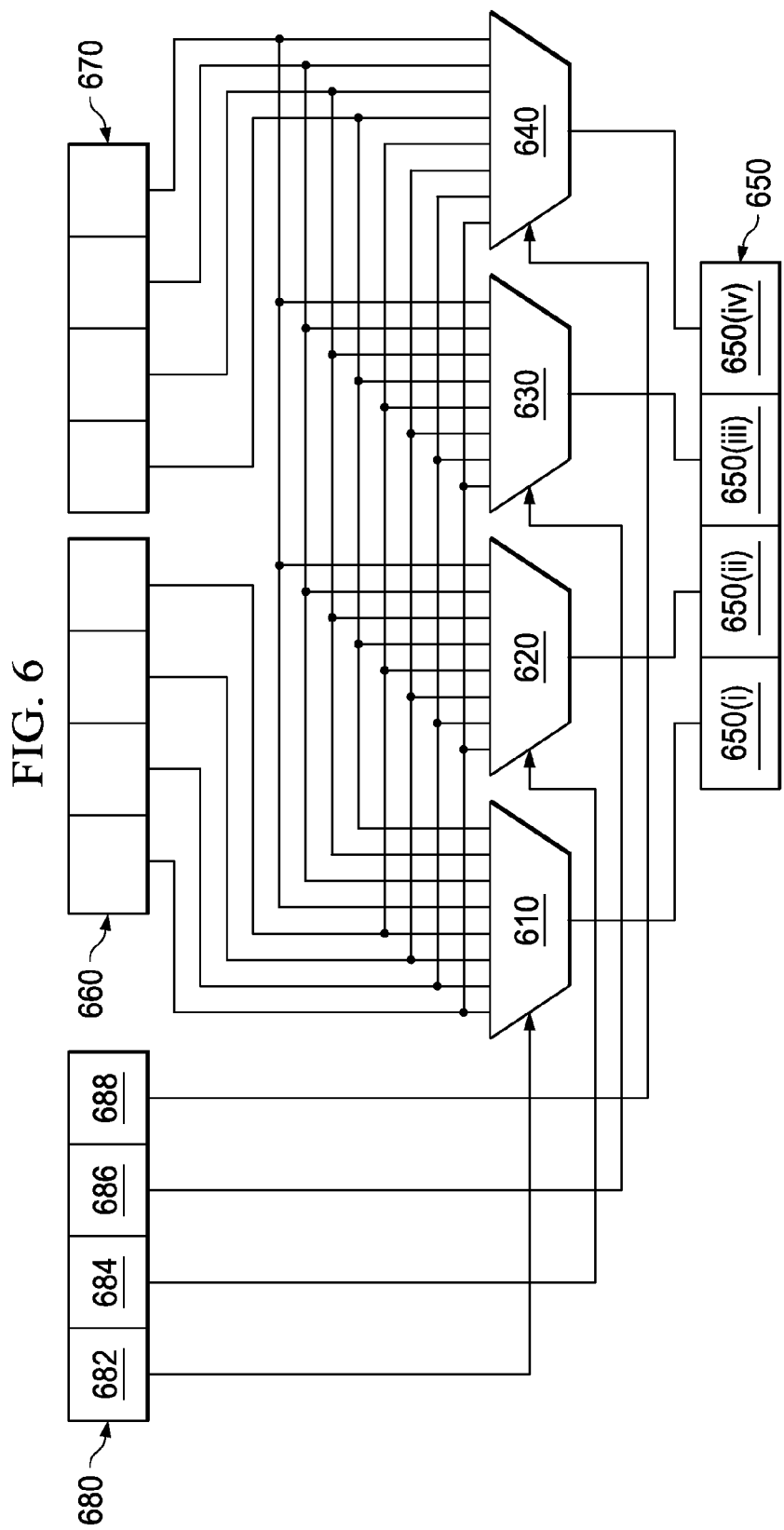
FIG. 6 is an exemplary diagram of the permutation logic for a quad-processing unit in accordance with one illustrative embodiment.

FIG. 6 is an exemplary diagram of the permutation logic for a quad-processing unit in accordance with one illustrative embodiment. As shown in FIG. 6, four multiplexers 610-640 are provided. Each multiplexer 610-640 outputs one of the input vector register elements as an output to a corresponding one of the vector elements in result vector register 650. In the depicted embodiment, each multiplexer 610-640 has eight inputs, one from each of the four elements of the vector registers 660 and 670. A third vector register 680 provides the control input to the multiplexers 610-640. That is, each element 682-688 is input to a respective one of the multiplexer 610-640 and identifies which input to output to the result vector register 650. The third vector register 680, is also part of the vector register file along with vector registers 660 and 670 and thus, has a similar configuration as described herein.

Thus, with the permutation logic of FIG. 6, the permute instruction of the floating point only SIMD ISA may select from two source vectors, any of the elements to generate one target vector. Operations are provided for constructing a control vector and storing that control vector in a vector register, such as vector register 680 in FIG. 6. In one illustrative embodiment, instructions for performing such operations are adapted to construct the control vector as a floating point vector from a literal, i.e. an immediate value field in the instruction word, encoded in the instruction word. In another illustrative embodiment, instructions are adapted to construct the control vector as a floating point vector from an address specified as an operand to the instruction. In either case, the control vector represents the permutation pattern for rearranging the data from one or more input vectors to generate an output data vector in an output vector register.

Thus, a FP-only SIMD ISA processor, data processing system, apparatus, or the like, such as that described in the illustrative embodiments herein, comprises at least a floating point vector register file containing at least two floating point vector register elements in a single floating point vector register and a permute unit receiving at least two input operands containing data to be permuted and at least one control vector indicating the permutation pattern as a floating point vector. The permute functionality of the permute unit supports an all-to-all permutation in which any of the floating point vector register elements of the two input floating point vector registers may be selected for storing in any floating point vector register element of a result floating point vector register. Selection of which floating point vector register element of the result floating point vector register is to be used is controlled by a floating point vector control value of the control vector. The floating point vector control values of the control vector specify a permutation pattern. The permutation pattern is, in one illustrative embodiment, a floating point vector encoded by way of high-order mantissa bits and a well-defined exponent value, as described hereafter.

In one illustrative embodiment, the floating point representation of the floating point vector values for the permute control vector is chosen to correspond to numbers having only a single possible representation. In another illustrative embodiment, the floating point representation of the floating point vector values for the permute control vector is chosen to correspond to numbers not requiring preprocessing to determine the control action of the permute unit. The permute instruction, that invokes the operation of the permute unit, is adapted to permute single and double precision values stored in the respective one of each vector locations directly.

The logic of the permute unit, as shown in the illustrative embodiment of FIG. 6, comprises one or more multiplexers, e.g., four multiplexers in the depicted example, each of the one or more multiplexers outputting a floating point value selected from floating point values of the at least two floating point vector register elements, as an output to a corresponding one of the floating point vector register elements in the result floating point vector register. The floating point vector register elements may represent input operands, for example. The vector elements of the control vector indicate the permutation pattern as a floating point vector that encodes the source of the floating point number. For example, with regard to the example of FIG. 6, the control vector 680, and more specifically its specific elements 682, 684, 686, and 688, encode the source information for each of the elements 650(i), 650(ii), 650(iii), and 650(iv). Element 680 (and specifically the slots 682, 684, 686 and 688) of FIG. 6 represent an alignment control vector that, as a software register, is specified by the register name qalign. Register 680 (register qalign) consists of 4 vector element slots each encoding the source to be selected by multiplexers 610 through 640 in accordance with FIG. 6.

Regardless of whether separate vector permute units are utilized, or the vector permute logic is integrated into a vector execution unit, such as the quad-processing unit (QPU) shown in FIG. 5 for example, the illustrative embodiments leverage the functionality of the vector permute logic to assist in performing data dependency comparisons for determining whether there are any dependencies that may cause issues with memory addressing operations. That is, the illustrative embodiments may make use of comparison logic within the permute logic to facilitate the comparisons between vector elements of input vector registers such that all of the comparison results may be obtained with fewer compare operations and fewer instruction calls. Moreover, the permute logic of the illustrative embodiments may be configured to reduce the number of remote vector elements that must be retrieved in order to perform the comparison operations, as will be described in greater detail hereafter.

Figure 7A:
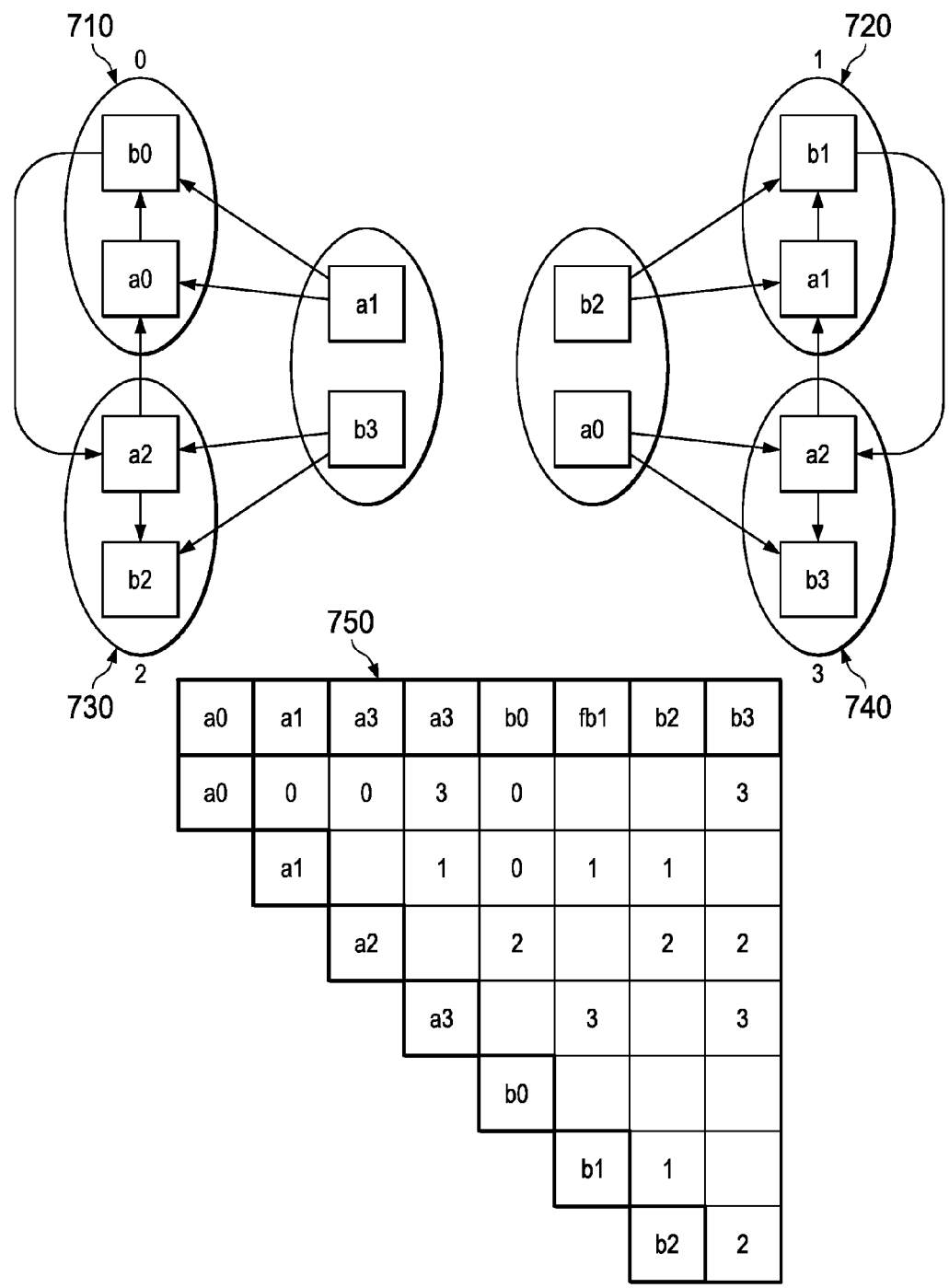
FIGS. 7A and 7B are example diagrams illustrating the particular comparisons performed by particular vector element slots in accordance with one illustrative embodiment.
Figure 7B:
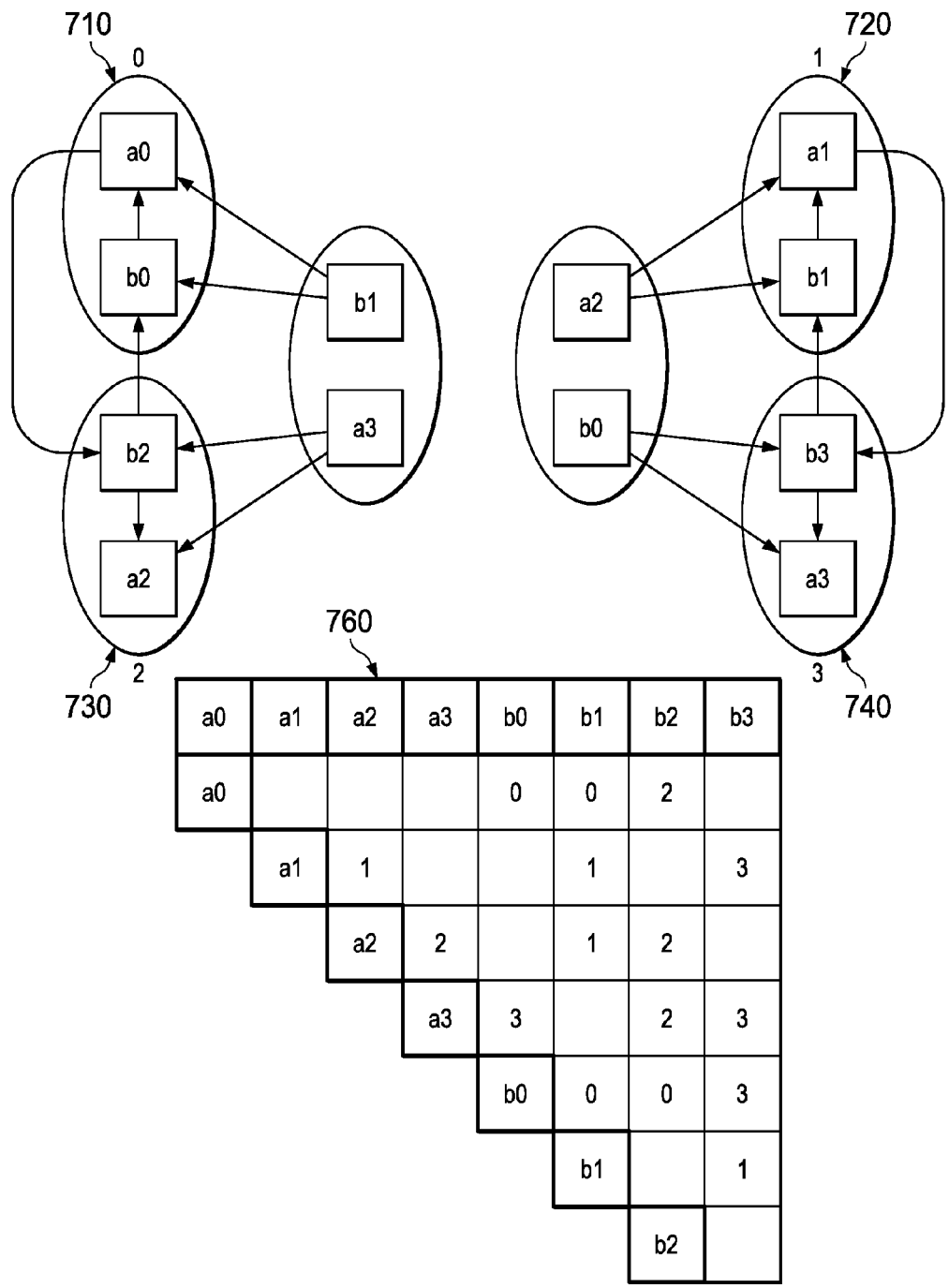

FIGS. 7A and 7B are example diagrams illustrating the particular comparisons performed by particular vector element slots in accordance with one illustrative embodiment. As shown in FIG. 7A, a first vector element slot 0 (meaning the slot 0 in input vector register A corresponding to the first vector element a0 and the slot 0 in input vector register B corresponding to the first vector element b0) stores the a0 address value for vector register A and the b0 address value for vector register B. A second vector element slot 1 stores the address values of a1 and b1 in the respective vector registers A and B. A third vector element slot 2 stores the address values of a2 and b2 in the respective vector registers A and B. Finally, a fourth vector element slot 3 stores the address values of a3 and b3 in the respective vector registers A and B.

In order to perform the comparison operations necessary for obtaining all of the compare results for determining any data dependencies, each of the comparisons being performed at each of the vector element slots 0-3 also receives one value from another vector element slot 0-3. For example, as shown in FIG. 7A, the vector element a1 is provided to the comparison logic 710 associated with vector element slot 0, vector element b2 is provided to the comparison logic 720 associated with vector element slot 1, vector element b3 is provided to the comparison logic 730 associated with vector element slot 2, and vector element a0 is provided to the comparison logic 740 associated with vector element slot 3.

These additional vector elements are referred to as remote values in this description since they must be obtained from a relatively remotely located register file in a distributed register file configuration as will be described hereafter. In addition, one near value (from a register file that is relatively near to the comparison logic in a distributed register file configuration) may be provided to the comparison logic of each of the vector slots 0-3. For example, the address value b0 is provided to the comparison logic 730 of vector slot 2 for comparison to address value a2. Similarly, the address value b1 is provided to comparison logic 740 of vector slot 3 for comparison to address value a2. In addition a2 is provided to the comparison logic 710 of vector slot 0 for comparison with a0 and a2 is provided to the comparison logic 720 of vector slot 1 for comparison with a1.

Comparisons are performed by the corresponding comparison logic 710-740 of the particular vector slot as illustrated by the arrows in FIG. 7A. Thus, for example, using the comparison logic 710 associated with vector slot 0, the address value of vector element a0 is compared to the address value of vector element b0, a1 is compared to both a0 and b0, and a2 is compared with a0. Thus, each of the comparison logic 710-740 performs four compare operations, giving 16 total compare operations being performed as a result of a single call to the simd-check instruction of the illustrative embodiments.

The comparison table 750 corresponding to the compare operations performed by the comparison logic 710-740 illustrates the vector slot comparison logic that performs the particular compares of the vector elements. That is, within comparison table 750, a value of "0" indicates that the comparison logic 710 associated with vector element slot 0 performed the comparison of the two vector elements corresponding to the row and column of that cell in the comparison table 750. The same is true for the other vector element slot numbers 1-3 in the comparison table 750. It can be seen from comparison table 750 that each of the comparison logic 710-740 of the vector element slots 0-3 performs four comparison operations and that the results obtained within the comparison table 750 are balanced.

FIG. 7B illustrates the same sort of comparisons as shown in FIG. 7A being performed using the same comparison logic 710-740 associated with the vector element slots 0-3 but with the input vector registers having been switched. This corresponds to a second call of the simd-check instruction of the illustrative embodiments. As shown in the comparison table 760 of FIG. 7B, the remaining comparisons of the check table which were not performed during the first call of the check instruction are now performed with this second call of the simd-check instruction. There is some overlap of these comparisons with the first call to the simd-check instruction, however this is acceptable to obtain the performance improvement of the comparisons performed by the illustrative embodiments.

As mentioned above, each of the comparison logic elements 710-740 associated with the vector slots 0-3 obtains one near value from another register file relatively close in physical proximity to the register file storing the vector elements corresponding to that vector slot, and one remote value from another register file relatively remote in physical proximity to the register file storing the vector elements corresponding to that vector slot. This is explained in greater detail hereafter with reference to FIG. 8.

Figure 8:
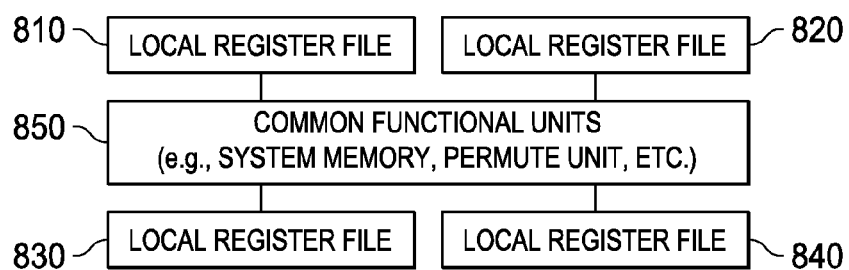
FIG. 8 is an example block diagram of a configuration of a distributed compute and register file architecture in which aspects of the illustrative embodiments may be implemented.

FIG. 8 is an example block diagram of a configuration of a distributed compute and register file architecture in which aspects of the illustrative embodiments may be implemented. With the architecture of FIG. 8, the global register file is distributed across subsets of registers 810-840 or local register files 810-840. Each subset of registers 810-840, or local register files 810-840, store the vector elements for one of the vector element slots of vector registers supported by the particular processor architecture. For example, if the processor architecture supports vector registers having four vector element slots, as in the depicted example, then four subsets of registers, or local register files, 810-840 are provided. Each local register file 810-840 stores vector element values for one of the four vector element slots. Thus, for example, local register file 810 stores all of the vector elements for vector element slot 0, e.g., a0, b0, c0, d0, etc. Local register file 820 stores all of the vector elements for vector element slot 1, e.g., a1, b1, c1, d1, etc.

Within a common functional unit region 850 of the architecture 800, various functional units of the processor architecture that make use of the data stored in the local register files 810-840 may be provided. For example, these common functional units may include memories, execution units, and the like. One such common functional unit that may be provided in this region 850 is the vector permute unit previously discussed above. This vector permute unit may comprise comparison logic, such as described above, for performing comparisons in response to the calling of a simd-check instruction, to determine if data dependency violations are present prior to performing a memory addressing operation, such as a scatter or gather operation, for example. It should be appreciated that while the comparison logic of the illustrative embodiments is described as being integrated into a vector permute unit of processor, the illustrative embodiments are not limited to such. Rather, in other illustrative embodiments, the comparison logic may be provided in a separate unit, or integrated and/or distributed across, other functional units of the processor architecture without departing from the spirit and scope of the illustrative embodiments.

Figure 9:
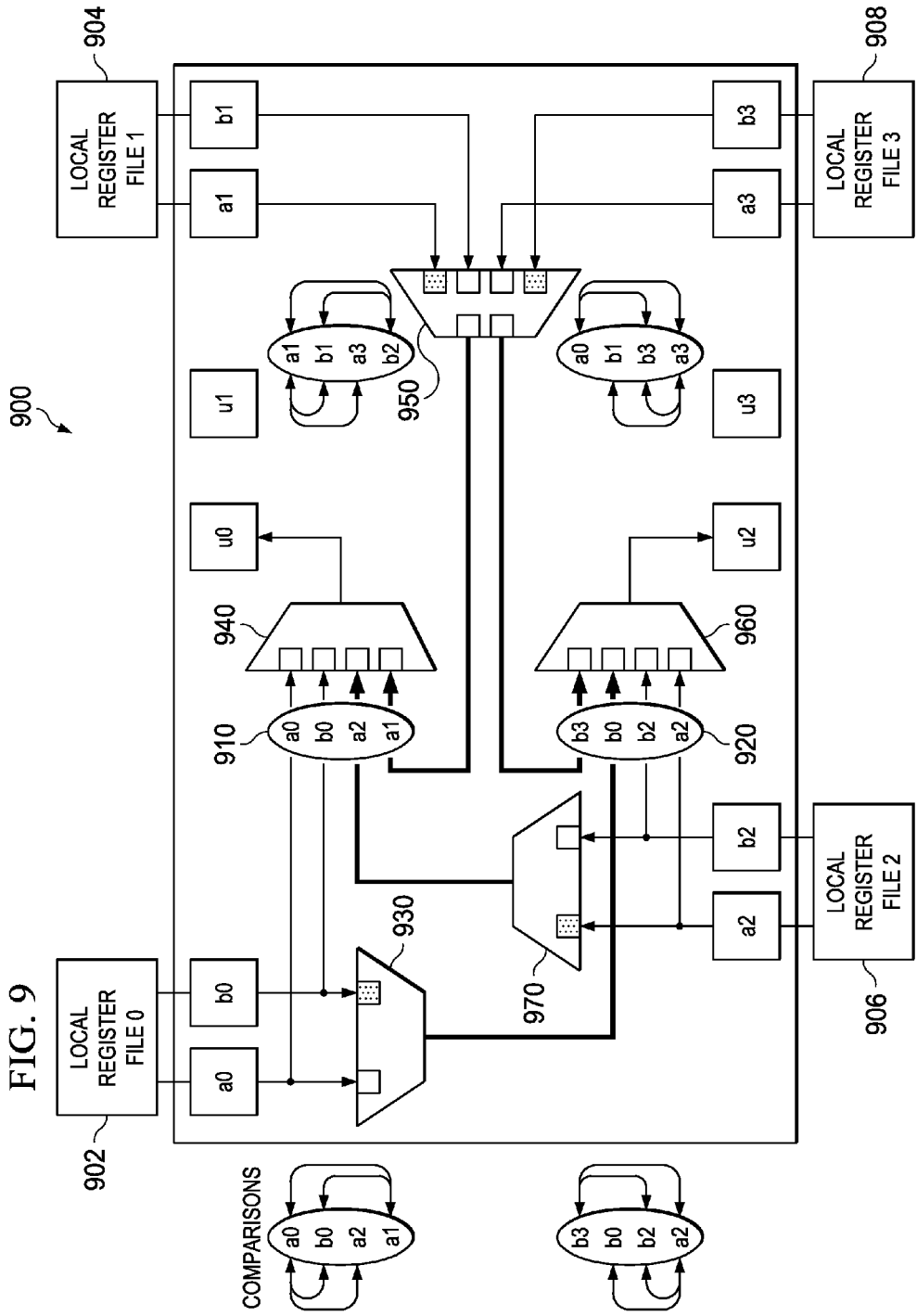
FIG. 9 is an example diagram of comparison logic of a permute unit that may be utilized to perform the compare operations for a simd-check instruction in accordance with one illustrative embodiment.

FIG. 9 is an example diagram of comparison logic of a permute unit that may be utilized to perform the compare operations for a simd-check instruction in accordance with one illustrative embodiment. For ease of explanation, only one side of the permute unit 900 logic is shown in FIG. 9 for performing comparisons for vector element slots 0 and 2. A mirror of this logic is provided, but not depicted in FIG. 9, for performing the comparisons for vector element slots 1 and 3. Elements shown in FIG. 9 are hardware implemented circuit logic which may be implemented in a permute unit, or as a separate comparison unit, within a processor of a data processing device/system.

As shown in FIG. 9, the permute unit 900 includes comparison logic 910, 920 and a plurality of multiplexers 930-970. Inputs to the permute unit 900 are obtained from local register files 902-908. As shown in FIG. 9, some of these local register files 902-908 are relatively near to the comparison logic 910, 920, e.g., local register files 902 and 906, while others of these local register files 902-908 are relatively remote to the comparison logic 910, 920, with regard to physical proximity. In a mirror of the logic in FIG. 9 that is provided for performing the comparisons for vector element slots 1 and 3, local register files 904 and 908 would be relatively near to the comparison logic in this mirror of FIG. 9, whereas local register riles 902 and 906 would be relatively remote.

The comparison logic 910, 920 each receives, as inputs, two local vector elements from a local register file 902, 906 that is closest in physical proximity to the comparison logic. Thus, for comparison logic 910, the two local vector elements are a0 and b0 which come from local register file 902. For comparison logic 920, the two local vector elements are a2 and b2 which come from local register file 906.

The comparison logic 910, 920 also each receive, as input, one vector element from a near register file 902, 906 that is near the comparison logic 910, 920 with regard to physical proximity, but is not the closest in physical proximity to the comparison logic. Thus, for example, the near vector element provided to comparison logic 910 is either a2 or b2 from local register file 906 and the near vector element provided to the comparison logic 920 is either a0 or b0 from local register file 902. The particular near vector element provided to the comparison logic 910, 920 is determined according to a permutation pattern input to the permute unit as part of the simd-check instruction of the illustrative embodiments, as described hereafter. The permutation pattern should be selected so as to ensure that all of the comparisons necessary to perform the complete set of comparisons for determining data dependence is achieved. Thus, the permutation pattern may be fixed or variable.

In the depicted example, the selection of a near vector element to input to comparison logic 910 is performed by multiplexer 970 having a2 and b2 vector elements as inputs from the local register file 906. The multiplexer 970 receives the permutation pattern, or a portion of the permutation pattern, as a control input (not shown) which instructs the multiplexer 970 as to which of the a2 and b2 vector elements to output to comparison logic 910. Similarly, multiplexer 930 is used to select between the input vector elements a0 and b0 for output to the comparison logic 920.

The comparison logic 910, 920 also each receive a remote vector element from remotely located local register files 904 and 908 as selected by multiplexer 950. Again, the permutation pattern, or a portion of the permutation pattern, that is input to the permute unit may be input to the multiplexer 950 as a control input specifying which values the multiplexer 950 is to output. Thus, in the depicted example, comparison logic 910 receives al as a remote vector element input and comparison logic 920 receives b3 as a remote vector element input. Again, the permutation pattern is selected such that all of the comparisons for the particular simd-check instruction are obtained by way of two calls to the simd-check instruction and thus, this pattern may be different for different implementations, may be fixed or variable, and may be specified in the simd-check instruction, stored in a register that provides the permutation pattern as input to the permute unit or within the permute unit itself, or the like.

The comparison logic 910 and 920 comprises various logic elements, such as comparators and the like, for performing the comparisons between the inputs in accordance with the previously described calls to the simd-check instruction, comparison tables, and the like. The simd-check instruction of the illustrative embodiments activates the same permute logic as a permute instruction, e.g., permute (<a0, a1, a2, a3>, <b0, b1, b2, b3>, <pattern>) but with a forced value of <pattern>, i.e. the permutation pattern. The simd-check instruction further activates the comparison logic 910 and 920. That is, the comparison logic 910 and 920 is able to be enabled or disabled within the permute unit. When a call to a simd-check instruction is being processed by the permute unit 900, the simd-check instruction causes the comparison logic 910 and 920 to be enabled. When a permute instruction is being processed by the permute unit 900, the comparison logic 910 and 920 is disabled and acts as a pass-through entity. In this way, the permute unit 900 may operate both as a permutation unit and as a comparator for performing the comparisons of the simd-check instruction of the illustrative embodiments.

The comparison logic 910 and 920 performs the comparison operations and outputs values indicative of whether there is a match between the address values, e.g., a 0 indicating no match or a 1 indicating a match. These outputs are provided to an output multiplexer 940, 960 which essentially performs the logic operation to determine if any of the inputs indicate a match, e.g., a logical OR operation. If all of the inputs are a 0, then the multiplexer 940, 960 outputs a 0 output to the respective output buffer u0 or u2. If any of the inputs is a 1, then the multiplexer 940, 960 outputs a 1 to the respective output buffer u0 or u2. The same operation is performed in a mirror of the depicted logic so as to provide the output values at buffers u1 and u3. These values are then returned as the result vector <u0, u1, u2, u3> of the simd-check instruction and indicate whether any data dependencies were found. Alternatively, the logical OR operation could be performed by the logic in 910 and 920, or by a distinct structure, for example.

As discussed above, this simd-check instruction is called twice with the second call being performed with the input vector registers being switched. This is to ensure that all of the comparisons for filling out the comparison table are performed and thus, all pairs of vector elements are compared. A second result vector is generated by the second call to the simd-check instruction in a similar manner as discussed above. These two result vectors indicate whether any of the comparisons in the comparison table result in a data dependency being detected.

The processor may, such as by way of a test operation, e.g., a test-all-zero operation, which may be integrated with the permute unit or provided as separate logic in the processor, then determine whether to continue the execution of the memory addressing operation or discontinue the operation with an exception or error condition based on the results obtained from the two calls to the simd-check instruction. For example, if a data dependence is found by executing either or both of the two calls to the simd-check instruction, then the processor may generate an exception or error condition that can be handled by an exception handler, may cause a termination of the memory addressing operation, or any other suitable operation depending upon the architecture and the executing code.

If the test-all-zero operation is integrated within the permute unit, in one embodiment, this test-all-zero operation may be implemented as a separate instruction. In another illustrative embodiment, this test-all-zero operation may be merged within the simd-check type of instructions, whereas each of the output slots u0, u1, u2, u3 are set to a value representing the "conflict detected" (if any) of the addresses where a match is found in the slots of the vector registers (i.e. if any conflict is detected by units 910 and 920, plus the mirrored units not shown in FIG. 9). In still another illustrative embodiment, a third input operand may be passed to the simd-check type of instruction to pass the result of a first call to simd-check to the second call of the simd-check with the two other input operands switched. The third operand may be logically OR'ed with the result of the second call of the simd-check instruction so as to produce a value representing whether a "conflict detected" (if any) is identified in either in the first or the second call to the simd-check instruction Thus, the illustrative embodiments provide mechanisms that permit comparisons for determining data dependencies to be performed using two calls to a simd-check instruction with the second call having the input vector registers switched. For an architecture having vector registers that have four vector element slots, each call to the simd-check instruction causes sixteen comparison operations to be performed at substantially a same time, i.e. four comparisons per vector element slot. Hardware logic is provided for performing the comparison operations either in a separate hardware unit of the processor, integrated with a functional hardware unit of the processor, and/or distributed across hardware units of the processor. In one illustrative embodiment, the comparison logic is implemented in a permute unit of a processor in such a way that the comparison logic is enabled for simd-check instructions and is disabled when permute instructions are processed by the permute unit.

It should be appreciated that while the above illustrative embodiments are described in terms of an architecture in which vector registers having four vector element slots is utilized, the illustrative embodiments are not limited to such. To the contrary, the mechanisms of the illustrative embodiments may be utilized with SIMD architectures that are configured for larger vector registers having more vector element slots than four. For example, with an architecture that supports vector registers having eight vector element slots, two compares of 8 vector elements would involve 120 compares. With the mechanisms of the illustrative embodiments in which the simd-check instruction is called twice, this would involve 60 compares per call of the simd-check instruction. This results in 8 compares per vector element slot (60/8=8 compares per vector element slot (rounded up)). The permutation pattern would again be selected to ensure that all of the compares for filling in the corresponding comparison table are covered by the 8 compares per vector element slot at each call of the simd-check instruction.

Figure 10:
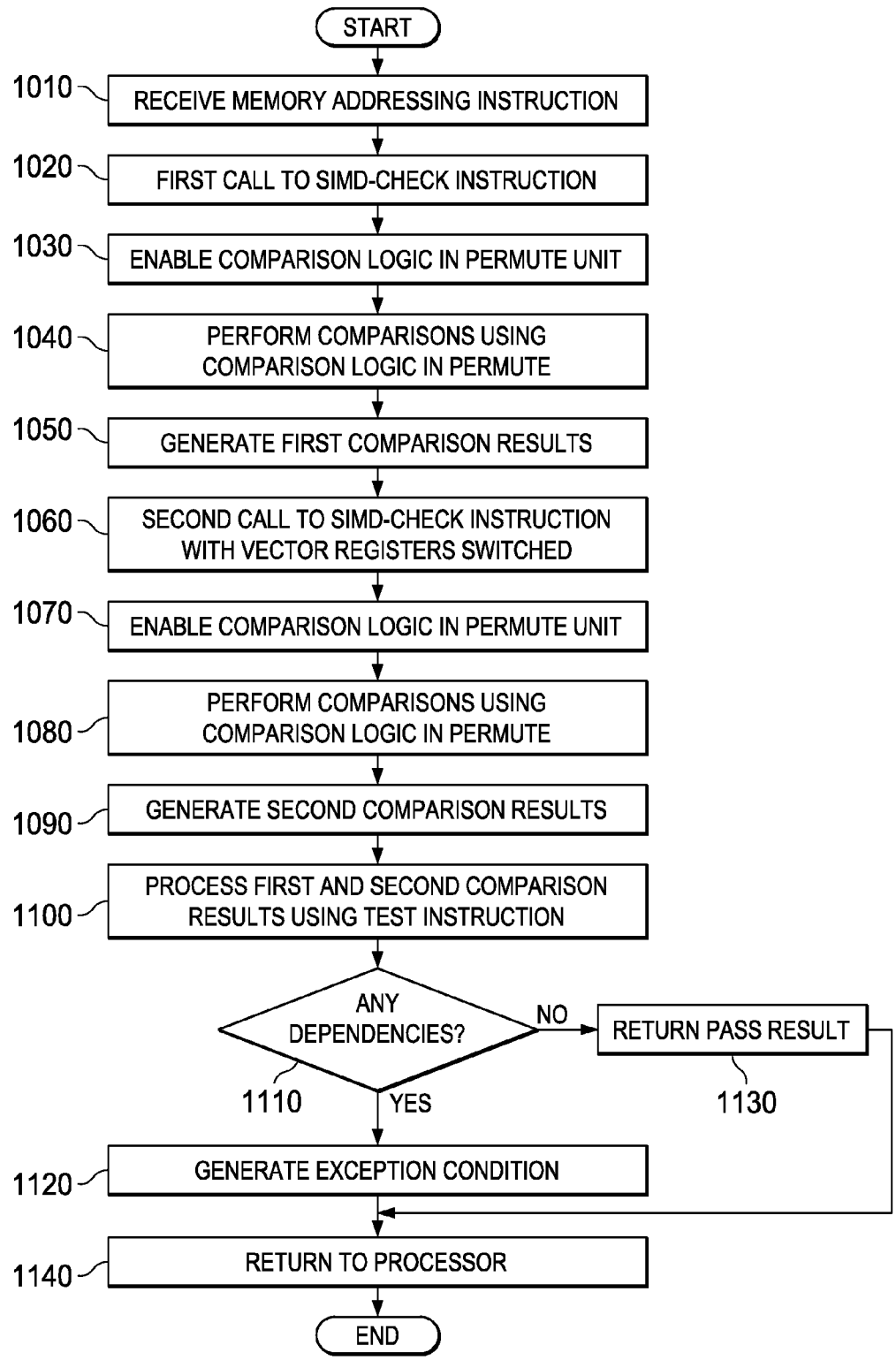
FIG. 10 is an example flowchart outlining an example operation for performing a data dependency check using a simd-check instruction and comparison logic in a permute unit of a processor in accordance with one illustrative embodiment.

FIG. 10 is an example flowchart outlining an example operation for performing a data dependency check using a simd-check instruction and comparison logic in a permute unit of a processor in accordance with one illustrative embodiment. The operation outlined in FIG. 10 may be implemented using a combination of software instruction calls and hardware logic for performing comparison operations in accordance with one illustrative embodiment.

As shown in FIG. 10, the operation starts with receiving, in the processor pipeline, a memory addressing instruction having two vector register inputs (step 1010). A first call to a simd-check instruction is performed using the two vector registers as inputs (step 1020). The call to the simd-check instruction causes comparison logic in the permute unit to be enabled (step 1030) and the comparison operations for the simd-check instruction are performed by the comparison logic of the permute unit (step 1040). A first comparison result is generated by the comparison logic of the permute unit (step 1050). A second call to the simd-check instruction is performed using the two vector registers as input, but with the order of the two vector registers having been switched (step 1060). The second call to the simd-check instruction also causes the comparison logic in the permute unit to be enabled (step 1070) and the comparison operations for the simd-check instruction are performed by the comparison logic of the permute unit (step 1080). A second comparison result is generated by the comparison logic of the permute unit (step 1090). The first and second comparison results are processed by a test logic (step 1100) that determines if any of the results indicate a data dependency (step 1110). If so, then an exception condition is triggered (step 1120); otherwise a pass result is returned indicating that there are no data dependencies (step 1130). The operation then returns to the processor (step 1140) and terminates.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system comprising a single instruction multiple data (SIMD) processor, comprising:
    executing, by the SIMD processor, a first call of a simd-check instruction using at least two vector registers as input vector registers of the simd-check instruction, wherein each of the at least two vector registers have a respective first order of input to the simd-check instruction;
    obtaining, by the SIMD processor, a first result of the execution of the first call of the simd-check instruction, wherein the first result indicates if any comparison operations of the first call of the simd-check instruction result in a match between vector elements of the at least two vector registers being detected;
    executing, by the SIMD processor, a second call of a simd-check instruction using the at least two vector registers as input vector registers of the simd-check instruction, wherein each of the at least two vector registers have a respective second order of input to the simd-check instruction that is different from the respective first order of input to the simd-check instruction;
    obtaining, by the SIMD processor, a second result of the execution of the second call of the simd-check instruction, wherein the second result indicates if any comparison operations of the second call of the simd-check instruction result in a match between vector elements of the at least two vector registers being detected; and
    executing a SIMD processor operation in the SIMD processor based on the first result and the second result.

2. The method of claim 1, wherein the SIMD processor operation is a memory addressing operation, and wherein executing the SIMD processor operation comprises either continuing the SIMD processor operation or generating an exception condition for the SIMD processor operation based on whether or not the first result or the second result indicates a data dependency between at least two vector elements of the at least two vector registers.

3. The method of claim 2, wherein if a data dependency is indicated by one or more of the first result or the second result, then the exception condition is generated for the SIMD processor operation.

4. The method of claim 1, wherein:
    each of the vector elements stores a value,
    the comparison operations of the first call of the simd-check instruction and the second call of the simd-check instruction compare values of vector dements of the at least two vector registers, and
    the values stored in the vector elements are one of address values, floating point values, or integer values.

5. The method of claim 1, wherein executing the first call of the simd-check instruction and executing the second call of the simd-check instruction comprises utilizing a permute unit of the SIMD processor to perform compare operations of the first call of the simd-check instruction and the second call of the simd-check instruction.

6. The method of claim 5, wherein the permute unit is configured to comprise comparison logic for each vector element of each of the at least two vector registers.

7. The method of claim 6, wherein each comparison logic for each vector element performs a plurality of comparisons of vector elements at substantially a same time in response to a single call of the simd-check instruction.

8. The method of claim 1, wherein the SIMD processor comprises a distributed register file configuration, and wherein the simd-check instruction is configured such that only one remote value and one neighbor value are communicated between logic associated with vector elements of the at least two vector registers in order to perform the comparison operations.

9. The method of claim 1, wherein the at least two vector registers comprises a first vector register and a second vector register, and wherein executing the first call to the simd-check instruction and executing the second call to the simd-check instruction comprises a total of 2 permute operations, 2 compare operations, one logical operation to combine the first result with the second result, and one test operation to test the combined result against a condition.

10. A computer program product comprising a non-transitory computer readable storage medium having a computer readable program stored therein, wherein the computer readable program, when executed on a computing device having a SIMD processor, causes the computing device to:
    execute a first call of a simd-check instruction using at least two vector registers as input vector registers of the simd-check instruction, wherein each of the at least two vector registers have a respective first order of input to the simd-check instruction;

obtain a first result of the execution of the first call of the simd-check instruction, wherein the first result indicates if any comparison operations of the first call of the simd-check instruction result in a match between vector elements of the at least two vector registers being detected;

execute a second call of a simd-check instruction using the at least two vector registers as input vector registers of the simd-check instruction, wherein each of the at least two vector registers have a respectiye second order of input to the simd-check instruction that is different from the respective first order of input to the simd-check instruction;

obtain a second result of the execution of the second call of the simd-check instruction, wherein the second result indicates if any comparison operations of the second call of the simd-check instruction result in a match between vector elements of the at least two vector registers being detected; and execute a computing device operation based on the first result and the second result.

11. The computer program product of claim 10, wherein the computing device operation is a memory addressing operation, and wherein executing the computing device operation comprises either continuing the computing device operation or generating an exception condition for the computing device operation based on whether or not the first result or the second result indicates a data dependency between at least two vector elements of the at least two vector registers.

12. The computer program product of claim 11, wherein if a data dependency is indicated by one or more of the first result or the second result, then the exception condition is generated for the computing device operation.

13. The computer program product of claim 10, wherein:
each of the vector elements stores a value,
the comparison operations of the first call of the simd-check instruction and the second call of the simd-check instruction compare values of vector elements of the at least two vector registers, and
the values stored in the vector elements are one of address values, floating point values, or integer values.

14. The computer program product of claim 10, wherein executing the first call of the simd-check instruction and executing the second call of the simd-check truction comprises utilizing a permute unit of the computing device to perform compare operations of the first call of the simd-check instruction and the second call of the simd-check instruction.

15. The computer program product of claim 14, wherein the permute unit is configured to comprise comparison logic for each vector element of each of the at least two vector registers.

16. The computer program product of claim 15, wherein each comparison logic for each vector element performs a plurality of comparisons of vector elements at substantially a same time in response to a single call of the simd-check instruction.

17. The computer program product of claim 10, wherein the computing device comprises a distributed register file configuration, and wherein the simd-check instruction is configured such that only one remote value and one neighbor value are communicated between logic associated with vector elements of the at least two vector registers in order to perform the comparison operations.

18. An apparatus, comprising:
a Single Instruction Multiple Data (SIMD) processor; and
a memory coupled to the processor and comprising instructions executed by the SIMD processor, wherein the SIMD processor is configured to:
execute a first call of a simd-check instruction using at least two vector registers as input vector registers of the simd-check instruction, wherein each of the at least two vector registers have a respective first order of input to the simd-check instruction;
obtain a first result of the execution of the first call of the simd-check instruction, wherein the first result indicates if any comparison operations of the first call of the simd-check instruction result in a match between vector elements of the at least two vector registers being detected;
execute a second call of a simd-check instruction using the at least two vector registers as input vector registers of the simd-check instruction, wherein each of the at least two vector registers have a respective second order of input to the simd-check instruction that is different from the respective first order of input to the simd-check instruction;
obtain a second result of the execution of the second call of the simd-check instruction, wherein the second result indicates if any comparison operations of the second call of the simd-check instruction result in a match between vector elements of the at least two vector registers being detected; and
execute a SIMD processor operation based on the first result and the second result.

19. The apparatus of claim 18, wherein the SIMD processor operation is a memory addressing operation for accessing a portion of the memory, and wherein executing the SIMD processor operation comprises either continuing the SIMD processor operation or generating an exception condition for the SIMD processor operation based on whether or not the first result or the second result indicates a data dependency between at least two vector elements of the at least two vector registers.

20. The apparatus of claim 19, wherein if a data dependency is indicated by one or more of the first result or the second result, then the exception condition is generated for the SIMD processor operation.

21. The apparatus of claim 18, wherein:
each of the vector elements stores a value,
the comparison operations of the first call of the simd-check instruction and the second call of the simd-check instruction compare values of vector elements of the at least two vector registers, and
the values stored in the vector elements are one of address values, floating point values, or integer values.

22. The apparatus of claim 18, wherein executing the first call of the simd-check instruction and executing the second call of the simd-check instruction comprises utilizing a permute unit of the SIMD processor to perform compare operations of the first call of the simd-check instruction and the second call of the simd-check instruction.

23. The apparatus of claim 22, wherein the permute unit is configured to comprise comparison logic for each vector element of each of the at least two vector registers.

24. The apparatus of claim 23, wherein each comparison logic for each vector element performs a plurality of comparisons of vector elements at substantially a same time in response to a single call of the simd-check instruction.

25. The apparatus of claim 18, wherein the SIMD processor comprises a distributed register file configuration, and wherein the simd-check instruction is configured such that only one remote value and one neighbor value are communicated between logic associated with vector elements of the at least two vector registers in order to perform the comparison operations.

\* \* \* \* \*